(12) United States Patent
Ganis et al.

(10) Patent No.: US 8,898,162 B2
(45) Date of Patent: Nov. 25, 2014

(54) METHODS, SYSTEMS, AND COMPUTER PROGRAM PRODUCTS FOR PROVIDING CUSTOMIZED CONTENT OVER A NETWORK

(75) Inventors: Mathew R. Ganis, Carmel, NY (US); Kapil Gupta, Brewster, NY (US); David Leip, Cortland Manor, NY (US); Santiago M. Rozas, Pound Ridge, NY (US); Klaus Johannes Rusch, Vienna (AT)

(73) Assignee: International Business Machines Corporation, Armonk, NY (US)

(*) Notice: Subject to any disclaimer, the term of this patent is extended or adjusted under 35 U.S.C. 154(b) by 2769 days.

(21) Appl. No.: 11/097,415

(22) Filed: Apr. 1, 2005

(65) Prior Publication Data
US 2006/0224689 A1    Oct. 5, 2006

(51) Int. Cl.
G06F 7/00      (2006.01)
G06F 17/30     (2006.01)

(52) U.S. Cl.
CPC ................................. G06F 17/3087 (2013.01)
USPC ........................................ 707/736; 707/723

(58) Field of Classification Search
None
See application file for complete search history.

(56) References Cited

U.S. PATENT DOCUMENTS

| | | | |
|---|---|---|---|
| 6,052,788 A | 4/2000 | Wesinger, Jr. et al. | 713/201 |
| 6,119,171 A | 9/2000 | Alkhatib | 709/245 |
| 7,243,153 B2* | 7/2007 | McIntyre et al. | 709/229 |
| 7,340,518 B1* | 3/2008 | Jenkins | 709/225 |
| 2002/0124056 A1* | 9/2002 | Dutta et al. | 709/218 |
| 2003/0009591 A1* | 1/2003 | Hayball et al. | 709/245 |
| 2003/0033155 A1* | 2/2003 | Peerson et al. | 705/1 |
| 2003/0093438 A1 | 5/2003 | Miller | 707/104.1 |
| 2003/0120653 A1* | 6/2003 | Brady et al. | 707/7 |
| 2003/0149690 A1* | 8/2003 | Kudlacik et al. | 707/3 |
| 2004/0030697 A1* | 2/2004 | Cochran et al. | 707/9 |
| 2004/0220903 A1* | 11/2004 | Shah et al. | 707/3 |
| 2005/0022008 A1* | 1/2005 | Goodman et al. | 713/201 |
| 2005/0108213 A1* | 5/2005 | Riise et al. | 707/3 |
| 2005/0203875 A1* | 9/2005 | Mohammed et al. | 707/2 |
| 2005/0256853 A1* | 11/2005 | Fellman | 707/3 |
| 2007/0061838 A1* | 3/2007 | Grubbs et al. | 725/35 |

* cited by examiner

*Primary Examiner* — Rehana Perveen
*Assistant Examiner* — Raheem Hoffler
(74) *Attorney, Agent, or Firm* — Cantor Colburn LLP; Louis Percello

(57) ABSTRACT

Methods, systems, and computer program products for providing customized content over a network are provided. The method includes associating content with at least one of a domain name, group, and geography for an entity, the content relating to at least one of the domain name, group, and geography. For each entity, the method also includes storing results of the association in a database record that is mapped to a domain name. In response to receiving a request to access a resource by the entity, the method further includes obtaining a domain name of the entity utilizing address information provided in the request, searching a database for the domain name of the entity, retrieving the database record corresponding to the domain name, generating a resource that includes the content, and providing the entity with the resource.

20 Claims, 8 Drawing Sheets

Example, Inc.

Edit Record ▶

| Example, Inc. request database | Status: active |
|---|---|
| Company name: | NASA: |
| Site URL: | http://extranet.example.com.nasa |
| Domain to look up: | .nasa.gov |
| Link text: | NASA customers |

FIG. 2

METHODS, SYSTEMS, AND COMPUTER PROGRAM PRODUCTS FOR PROVIDING CUSTOMIZED CONTENT OVER A NETWORK

BACKGROUND OF THE INVENTION

The present disclosure relates generally to web based services, and, in particular, to methods, systems, and computer program products for providing customized content over a network.

Information is one of an organization's main sources of competitive advantage. It can enable a company to find an opportunity, identify and correct a liability, or provide input to the kind of synthesis that moves it forward. This is true today more than ever. The sources and range of information are expanding exponentially. Ironically, however, this increasing volume of information has a parallel trend in obscurity of information. The more information there is available, the harder it becomes to focus on the sources and subjects that are relevant. A significant resource for obtaining information is the World Wide Web (WWW), or Web for short. Web users utilize web browser programs for acquiring and processing desired information.

Organizations often provide direct access to information on one or more websites maintained by, or on behalf of, the organizations. This direct access may be provided in the form of an extranet that enables authorized customers or preferred entities to obtain a variety of information and content that is not otherwise provided to the general public. When an authorized entity accesses an organization's website, the entity is provided with a main webpage with options or links for directing the entity to additional content. The content provided is often in the form of generalized information in that it does not discriminate among the different requesting entities, nor does it factor in the specific interests of these requesting entities, which may be substantially diverse in nature. Thus, finding content on the website that is of specific interest to the requesting entities can be difficult and time consuming. It is, of course, of great benefit to both the organization and the requesting entities to provide and obtain useful information in an efficient manner.

Therefore, it is desirable to provide a way to implement network-based services that offer customized content targeted to specific requesting entities.

BRIEF SUMMARY OF THE INVENTION

Embodiments of the invention include a method for providing customized content over a network. The method includes associating content with at least one of a domain name, group, and geography for an entity, the content relating to at least one of the domain name, group, and geography. For each entity, the method also includes storing results of the association in a database record that is mapped to a domain name. In response to receiving a request to access a resource by the entity, the method further includes obtaining a domain name of the entity utilizing address information provided in the request, searching a database for the domain name of the entity, retrieving the database record corresponding to the domain name, generating a resource that includes the content, and providing the entity with the resource.

Additional embodiments include a system for providing customized content over a network. The system includes a customized content application executing on a host system. The customized content application associates content with at least one of a domain name, group, and geography for an entity. The content relates to the domain name, group, and geography. For each entity, the customized content application stores results of the associating in a database record that is mapped to a domain name. In response to receiving a request to access a resource by the entity, the customized content application obtains a domain name of the entity utilizing address information provided in the request, searches a database for the domain name of the entity, retrieves the database record corresponding to the domain name, generates a resource that includes the content, and provides the entity with the resource.

Further embodiments include a computer program product for providing customized content over a network. The computer program product includes instructions for implementing a method. The method includes associating content with at least one of a domain name, group, and geography for an entity, the content relating to at least one of the domain name, group, and geography. For each entity, the method also includes storing results of the association in a database record that is mapped to a domain name. In response to receiving a request to access a resource on by the entity, the method further includes obtaining a domain name of the entity utilizing address information provided in the request, searching a database for the domain name of the entity, retrieving the database record corresponding to the domain name, generating a resource that includes the content, and providing the entity with the resource.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a database record for an entity for which the customized content services may be implemented in exemplary embodiments;

The detailed description explains the preferred embodiments of the invention, together with advantages and features, by way of example with reference to the drawings.

DETAILED DESCRIPTION OF THE INVENTION

In accordance with exemplary embodiments, customized content services are provided. Entities requesting content from a website may reference a single World Wide Web (WWW) resource and retrieve a unique set of content in return. The customized content services utilize information provided by the requesting entity such as the unique Internet Protocol (IP) address and Hypertext Transfer Protocol (HTTP) request headers to determine what type of information should be provided in the returned resource. When a requesting entity connects to the host system, the customized content services map the IP address to a domain name utilizing the Domain Name System (DNS). Based upon this information, the customized content services deduce the domain name of the requesting entity. Domain names are structured in a multi-level, hierarchical fashion. Consider, for example, the domain name "www.ibm.com." This domain name includes a top level, or root domain (.com), a second level which identifies the host ("ibm"), and at least one additional level (e.g., www). The second level may be further broken down into sub-domains, which are individually addressable and collectively form the domain (e.g., "www.sales.ibm.com" and "www.service.ibm.com", together are considered to be in the same domain "ibm.com". The customized content services reference one or more databases that associate domain names and, if applicable, specific groups and returns content specific to that requesting entity.

Figure 1:
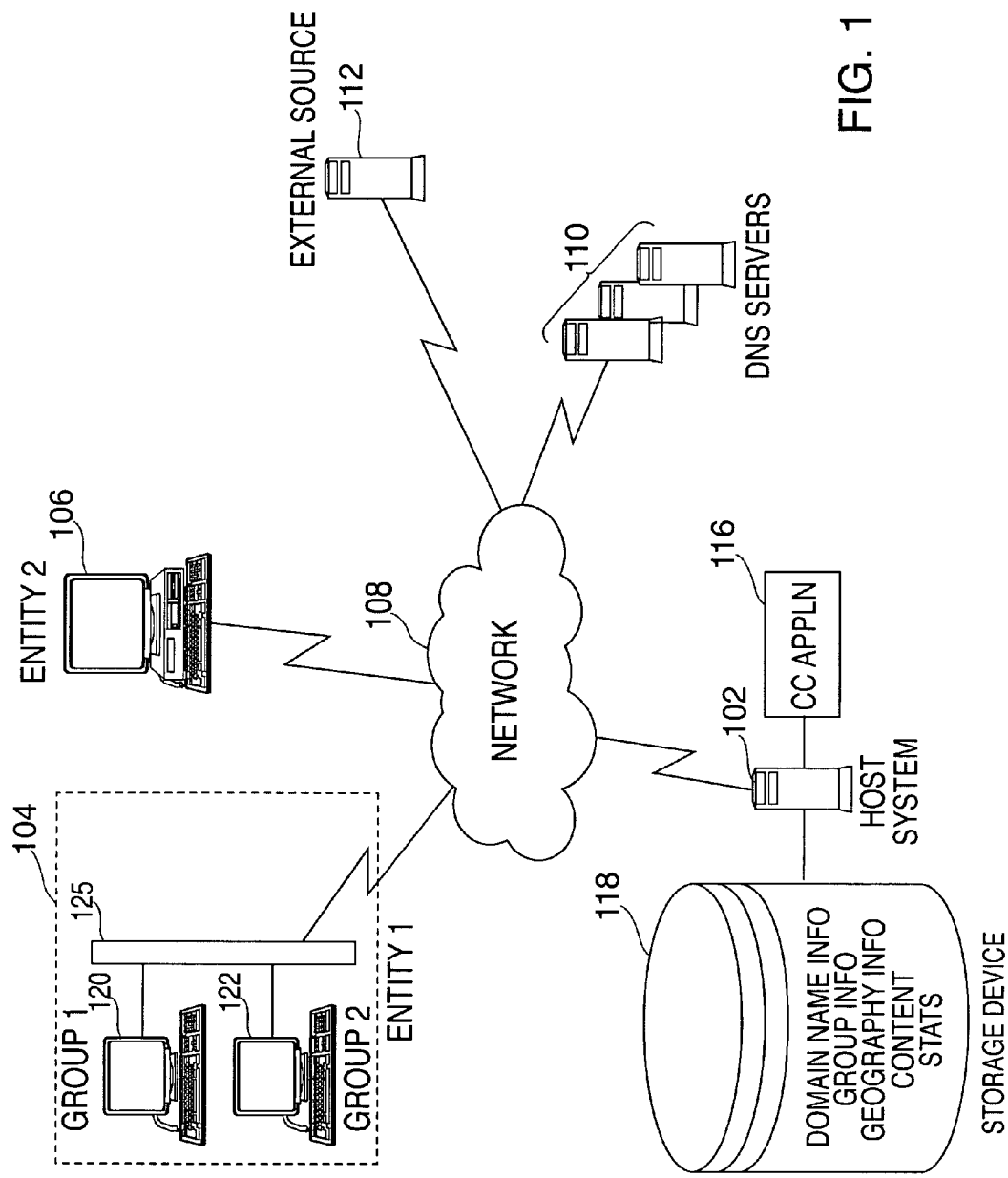
FIG. 1 is a block diagram illustrating a system upon which the customized content services may be implemented in exemplary embodiments.

Turning now to FIG. 1, a system upon which the customized content services may be implemented in accordance with exemplary embodiments will now be described. The system of FIG. 1 includes a host system 102 in communication with two entities 1 and 2 via a network 108. Host system 102 may be implemented using one or more servers operating in response to a computer program stored in a storage medium accessible by the server or servers. The host system 102 may operate as a network server (e.g., a web server) to communicate with network entities such as entities 1 and 2. The host system 102 may handle sending and receiving information to and from network entities, e.g., entities 1 and 2 and may perform associated tasks.

The host system 102 may also operate as an application server. In accordance with exemplary embodiments, the host system 102 executes one or more computer programs to provide customized content services. These one or more computer programs are referred to collectively herein as a customized content application 116. In alternative embodiments, a portion of the processing associated with the customized content services may be implemented by network entities such as entities 1 and 2 as described further herein.

As previously described, it is understood that separate servers may be utilized to implement the network server functions and the application server functions of host system 102. Alternatively, the network server and the application server may be implemented by a single server executing computer programs to perform the requisite functions described with respect to host system 102.

Entities 1 and 2 refer to source entities which desire information from the host system 102. For example, entities 1 and 2 may comprise customers of an organization that provides information, products, and/or services to the source entities 1 and 2 over network 108 via its website. For purposes of illustration, entity 1 includes two client systems 120 and 122 connected via a local network 125. Entity 2 comprises a single client system 106 in direct communication with host system 102 via network 108. The local network may be a local area network (LAN) whereby client systems 120 and 122 reside in a limited geographic region (e.g., a building). Alternatively, local network 125 may comprise a wide area network (WAN) or metropolitan area network (MAN) whereby client systems 120 and 122 reside in different geographic regions (e.g., across a campus, town, etc.)

Also, for purposes of illustration, client systems 120 and 122 may each comprise a distinct group, which in turn refers to an association of individuals, business divisions, commodities, subsidiaries, or other type of association that differentiates among its members, business units, trading partners (e.g., business partner, customers, etc.) Alternatively, groups may be specific industry subsets (e.g., financial services, manufacturing, etc.).

Each of client systems 120, 122, and 106 may be implemented using a general-purpose computer executing a computer program for carrying out some of the processes described herein. The client systems 120, 122, and 106 may be personal computers (e.g., a lap top, a personal digital assistant) or host attached terminals. Each of client systems 120, 122, and 106 may include various applications such as a web browser application (e.g., Internet Explorer®, Netscape Navigator®, etc.), for performing web activities.

Host system 102 is in communication with a storage device 118. Storage device 118 may be implemented using a variety of devices for storing electronic information. It is understood that the storage device 118 may be implemented using memory contained in the host system 102, or it may be a separate physical device. The storage device 118 is logically addressable as a consolidated data source across a distributed environment that includes network 108. Information stored in the storage device 118 may be retrieved and manipulated via the host system 102 and authorized users of clients systems 120, 122, and 106. In an exemplary embodiment, the host system 102 operates as a database server and coordinates access to application data including data stored on storage device 118.

Storage device 118 stores a variety of information and content relating to customers or requesting entities of the organization associated with the host system 102. Examples of the types of information stored in storage device 118 and managed by the customized content application 116 may include domain name information (including sub-domain information), group information, geographic information, and statistics. One or more databases may be utilized for organizing this information. For example, the organization of host system 102 may maintain database records for each of its customers which provide domain name information, group information, and geographic information. A sample database record 200 is shown in FIG. 2.

The database record 200 of FIG. 2 includes various fields of information including a "Company name" field 202 which value comprises a descriptor for identifying the record 200 in the database. Also included is a "Site URL" field 204 that represents a portion of the customized content (e.g., in the example used herein, this field provides the address of a website that is to be presented to a group). Database record 200 also includes a "Domain to look up" field 206 that is associated with the company name provided in field 202. This functionality of this field 206 is described further herein. Also shown in database record 200 is a "Link text" field 208, which enables the custom content application 116 to associate specific content to a target audience. This field 208 is also described further herein. The organization of host system 102 utilizes these categories of information to provide targeted and customized content via its website to customers.

The customized content application 116 may access information available from the external source entity 112 and utilize this information in generating and providing customized content to requesting entities 1 and 2. External source entity 112 refers to a source of information that is external to the host system 102, and may be provided by a third party. The external source entity 112 may be implemented using one or more servers operating in response to a computer program stored therein or in a storage medium accessible by the server or servers (e.g., in a manner similar to that described above with respect to host system 102).

Network 108 may be any type of known network including, but not limited to, a local area network (LAN), a wide area network (WAN), a global network (e.g. the Internet), a private network (e.g. an Intranet), and a virtual private network (VPN). The network 108 may be implemented using a wireless network or any kind of physical network implementation known in the art. Client systems 120, 122, and 106, as well as other network entities (e.g., external source server 112 and domain name servers 110), may be coupled to the host system 102 through multiple networks (e.g., intranet and Internet) so that not all network entities are coupled to the host system 102 through the same network. One or more of the network entities and the host system 102 may be connected to the network 108 in a wireless fashion.

It will be understood that any number of source entities, remote hosts, and external source entities may be utilized in providing the customized content services described herein. The elements shown and described with respect to the system of FIG. 1 are provided for purposes of illustration and are not to be construed as limiting in scope.

Domain name servers (DNS servers) 110 refer to an entity that provides the mapping of IP addresses to domain names for network elements such as entities 1 and 2.

Figure 3:
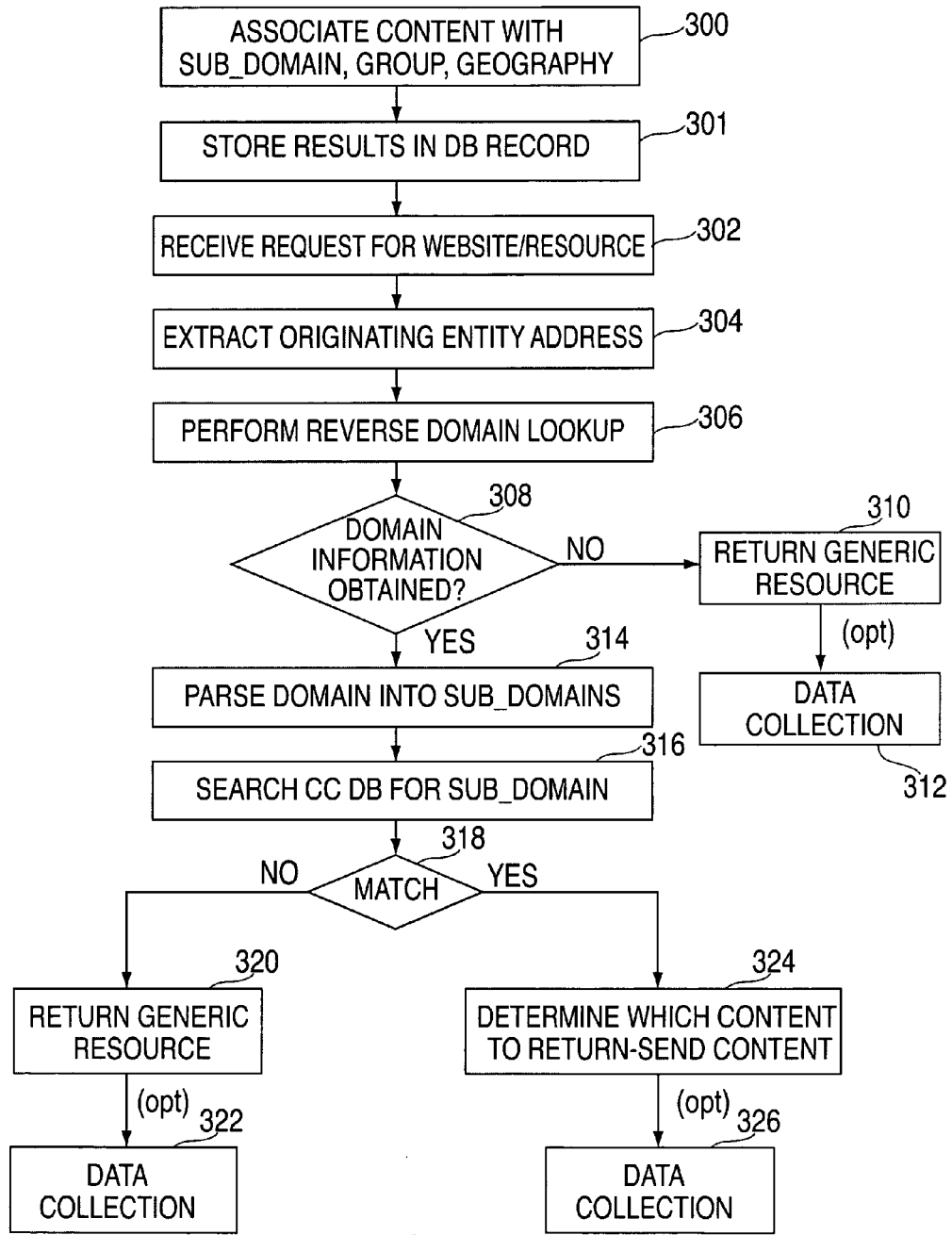
FIG. 3 is a flow diagram describing a process for implementing the customized content services in exemplary embodiments.

Turning now to FIG. 3, a process for implementing the customized content services in accordance with exemplary embodiments will now be described. At step 300, content is associated with one or more sub-domains, groups, and geographies for an entity. This subject of this content is associated based upon the relevance of the content to the sub-domains, groups, geographies, etc. The results of these associations are stored for access and use (e.g., in database record 200 of FIG. 2) at step 301. These steps (300 and 301) may be repeated for each entity associated with the host system 102. At step 302, host system 102 receives a request for a website resource from one of entities 1 and 2. For example, client system 120 accesses a website resource http://www.example.com/. Upon receiving this request at the host system 102, customized content application 116 extracts the information from the request for access at step 304. This information may include, e.g., a unique IP address and HTTP header information. It will be understood that other information may be provided with the request depending upon the nature of the transmission.

The information is parsed in order to obtain specific address information relating to the requesting entity. For example, the specific address information may be the IP address of the requesting entity. The host system 102 contacts DNS servers 110 and performs a reverse domain name lookup from the IP address at step 306. If there is no match at step 308, a generic resource of the host 102 organization is returned to the requesting entity at step 310. Optionally, the customized content application 116 gathers data regarding this requesting entity for statistical use at step 312. Data that may be collected includes information that is part of the HTTP request (e.g., client cookie information, client IP address, referrer URL, etc.). This data may be used for additional customization (e.g., extra customization based on cookie information, etc.) or for future data analysis (e.g., metrics and trend analysis, etc.).

If there is a match at step 308, the customized content application 116 parses the domain name into sub-domains if applicable at step 314. For example, suppose the result of the domain name search is gateway.electronics.requestingcompany.com. The customized content application 116 searches storage device 118 for a match at step 316. This may be implemented via the value provided in the "Domain to look up" field 206 of database record 200 of FIG. 2. For example, a search for electronics.requestingcompany.com may produce the match requestingcompany.com.

Figure 4:
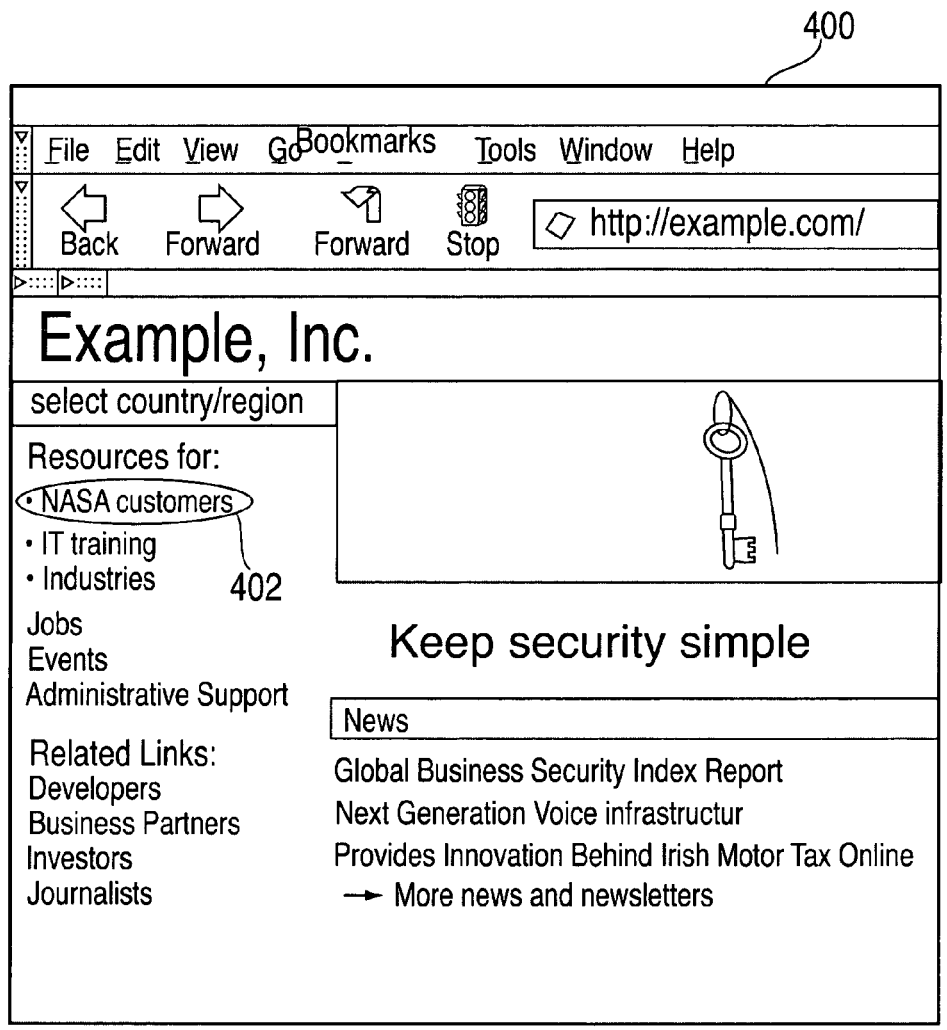
FIG. 4 is a user interface screen depicting a sample customized webpage resource created and provided by the customized content system in exemplary embodiments.

If there is a match at step 318, the customized content application 116 determines which content to return to the requesting entity at step 324. A sample webpage resource with customized content in the form of a Hypertext Markup Language (HTML) link is provided in the user interface screen 400 depicted in FIG. 4. Again, the customized content application 116 may optionally collect data from the requesting entity at step 326.

If, however, no match is found at step 318, this indicates that the requesting entity may not be a defined entity in the storage device 118. In this instance, the customized content application 116 directs the host system 102 to return a generic resource to the requesting entity at step 320. Optionally, data collection may be performed at step 322.

The returned content may be customized utilizing the categories of information described above with respect to the database record 200 of FIG. 2. For example, suppose that client device 120 requests a resource from host system 102. The client device is associated with a first group of entity 1. This first group may be determined, e.g., by the nature of the business unit from which the requesting individual is associated. Suppose that the requesting entity is determined to be from the domain name gateway.electronics.requestingcompany.com. The group in this instance relates to an electronics division of the requesting company. Thus, the customized content application 116 would return content that includes information specific to the electronics-based interests of the requesting entity. On the other hand, suppose that a client system 122 also requests a resource from the host system 102 using the same website address. Client system 122 belongs to a second group of the requesting entity (e.g., gateway.sales.requestingcompany.com). Despite the fact that both client systems used the same address, the customized content application 116 may return different content to each of these "groups" of requesters due to the nature of information extracted from the request (e.g., the IP address and HTTP header information).

Further, the content provided may be customized based upon the geographic location or affiliation of the requesting entity (e.g., entities of foreign countries, regions, and language spoken). This may also be implemented by identifying the country code associated with the domain name of the requesting entity (e.g., gateway.requestingcompany.co.uk).

In further embodiments, the customized content may be determined utilizing a combination of the categories above (e.g., two or more of group, entity, and geography). Moreover, the customized content may be determined and/or augmented by providing targeted information acquired from external sources such as external source entity 112. External sources may include business partner/trading partner entities, governmental or organizational entities (e.g., trade associations, business consortiums, regulatory agencies, etc.).

As described in the system of FIG. 1, the customized content services are implemented via a host system 102 of the organization, that is as a server-side implementation. In alternative exemplary embodiments, the resource returned by host system 102 may be provided in formats which can be embedded in, or referenced from, other resources, including but not limited to web pages on the same host system 102 or on another host system. The formats may include image and multimedia data, interactive content or other media types.

In alternative exemplary embodiments, the resource returned by host system 102 may be provided as client-side software that may be interpreted or executed by the requesting client system. Additional information may be passed on to the client-side software as parameters. For example, the following code may be included in web pages, such as on host system 102:

<script type="text/javascript" language="JavaScript" src="http://www.example.com/
    customize?isolang=en_US"></script>

"Customize" refers to the name of the application on the host system 102 website, and the parameter "isolang=en_US" can be used by the host system 102 for further customizing the returned resource, for example by returning a resource localized for U.S. English. The client-side software can further customize the content and behavior of the resource that includes the reference to the client-side software resource.

In alternative exemplary embodiments, the customized content service can be implemented as a web service, whereby the client system is a web services client that request a resource using web services protocols, that is invokes a method, and the host system 102 returns a web services response to the client system, which can be further used by the client system for providing customized content.

As described above with respect to FIG. 1, the customized content activities of the present invention may reside on a stand-alone computer system, which may have access to the Internet, or may reside on a computer system which is part of the network through which there is Internet access. With a connection to a network and/or the Internet, there are several different ways in which the process software used to implement the systems and methods of the customized content system may be integrated with host systems and the network. The following descriptions review the various ways of accomplishing these activities.

Integration of customized content system software. To implement the customized content services of the present invention, process software, which is composed of the software as described above and related components including any needed data structures, is written and then if desired, integrated into a client, server, and network environment. This integration is accomplished by taking those steps needed to enable the process software to coexist with other software, including application, middleware, operating system and networking software, and then installing the process software on the clients and servers in the environment where the process software will function. An overview of this integration activity will now be provided, followed by a more detailed description of the same with reference to the flowcharts of FIG. 5.

The first step in the integration activity is to identify any software on the servers where the process software will be deployed that are required by the process software or that need to work in conjunction with the process software. This includes application, middleware, operating system and networking software Next, the software applications and version numbers are identified and compared to the list of software applications and version numbers that have been tested to work with the process software. Those software applications that are missing or that do not match the required version are installed or updated to the required level on the servers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The server operating system including networking software is identified and compared to the list of operating systems and version numbers that have been tested to work with the process software. Those operating systems that are missing or that do not match the list of tested operating systems and version numbers are then installed or upgraded to the required level on the servers.

After ensuring that the software resident on the computer systems where the process software is to be deployed is complete and at the required version levels, that is, has been tested to work with the process software, the integration is completed. This is done by installing the process software on the servers. Armed with the foregoing overview of the integration activity, the following detailed description of the same should be readily understood.

Figure 5:
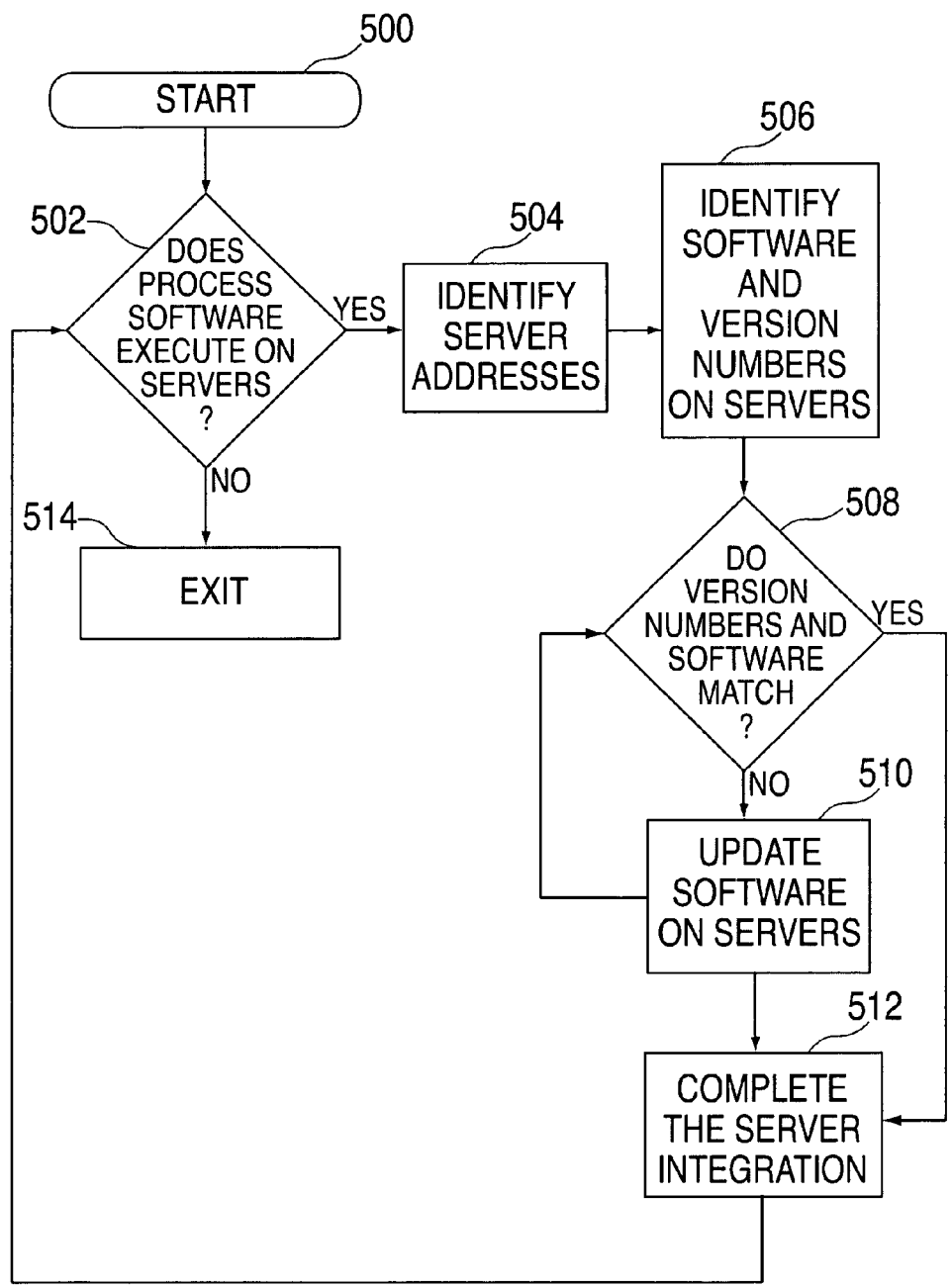
FIG. 5 is a flowchart illustrating how the process software implementing the systems and methods of the invention may be integrated into client, server, and network environments.

Referring to FIG. 5, step 500 begins the integration of the process software for implementing the customized content systems and methods of the present invention. It is determined whether there are any process software programs that will execute on a server or servers at step 502. If there are process software programs that will execute on a server or servers, then the server addresses are identified at step 504. The servers are checked to see if they contain software, including application, middleware, operating system and networking software, together with their version numbers that have been tested with the process software at step 506. The servers are also checked to determine if any software that is required by the process software as part of the activity at step 506 is missing. A determination is made whether the version numbers match the version numbers that have been tested with the process software at step 508. If all of the versions match, and no required software is missing, the integration process is completed at step 512 and the process exits at step 514. If one or more of the version numbers do not match, then the unmatched versions are updated on the server or servers with the correct versions at step 510. Additionally, if required software is missing on the server or servers, then it is installed or updated on the server or servers at step 510. The process returns to step 508 to ensure the versions match. The server integration is completed by installing the process software at step 512 and exiting the process at step 514.

Returning now to step 502, if it is determined that there are no process software programs that will execute on a server or servers, the process exits at step 514.

Figure 6:
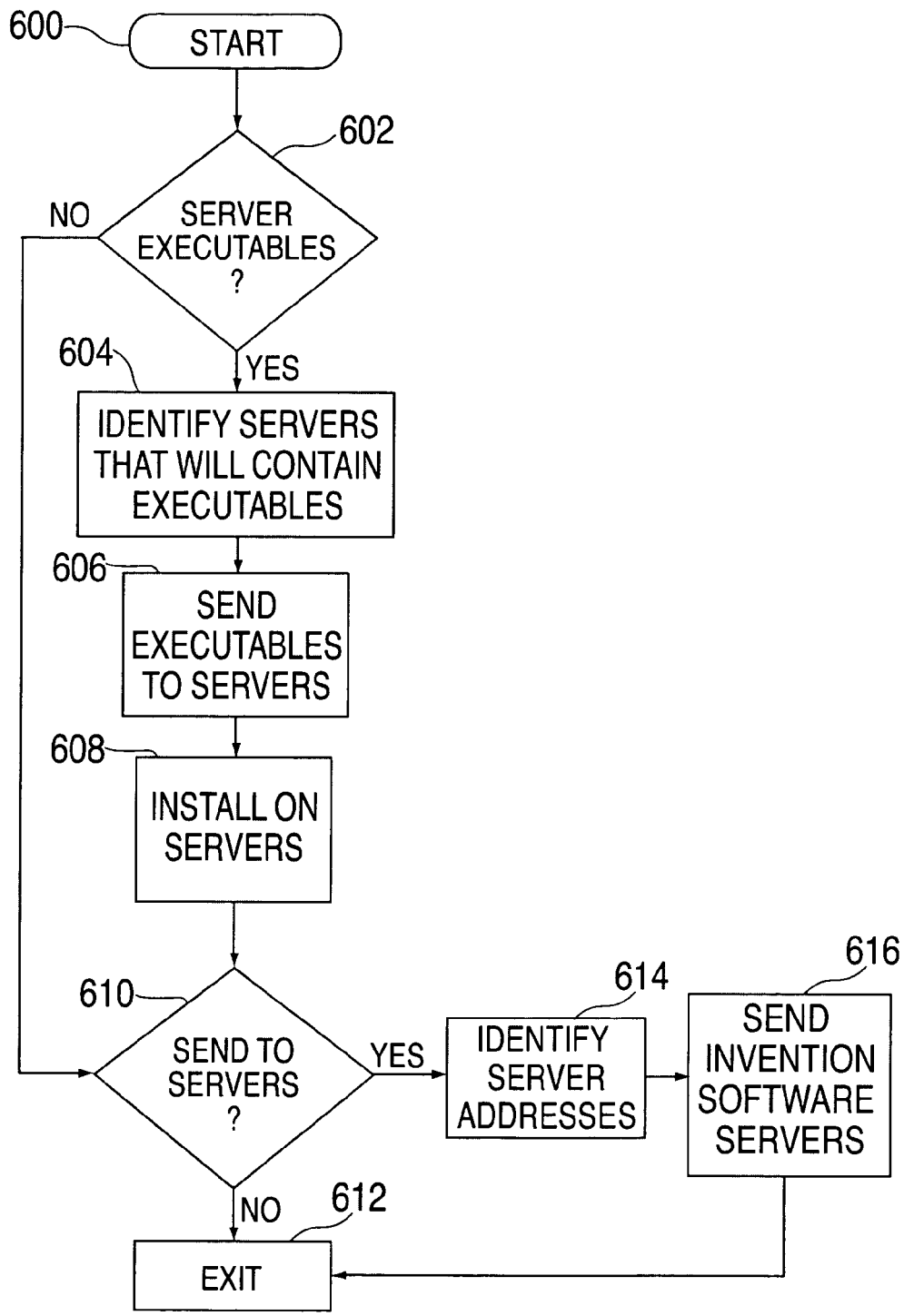
FIG. 6 is a flowchart illustrating various ways in which the process software of the invention may be semi-automatically or automatically deployed across various networks and onto server, client (user), and proxy computers.

Deployment of customized content system software. It will be understood that the process software for implementing the customized content services of the present invention may be deployed by manually loading the process software directly into the server from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the server computers that will execute the process software as shown and described in FIG. 6.

Step 600 begins the deployment of the process software. It is determined whether there are any programs that will reside on a server or servers when the process software is executed at step 602. If the answer is "yes", then the servers that will contain the executables are identified, as indicated in step 604. The process software for the server or servers is transferred directly to the servers' storage via FTP or some other protocol or by copying though the use of a shared file system at step 606. The process software is then installed on the servers as indicated at step 608.

Next, as shown in step 610, or alternatively, if it is determined that there are no programs that will reside on a server or servers when the process software is executed, a determination is made on whether the process software is to be deployed by having users access the process software on a server or servers. If the users are to access the process software on servers, then the server addresses that will store the process software are identified at step 614. Next, the process software for implementing the present invention is sent to the servers, as indicated in step 616, and the process exits at step 612. Turning back to step 610, if it is determined that the users are not to access the process software on servers, the process exits at step 612.

Figure 7A:
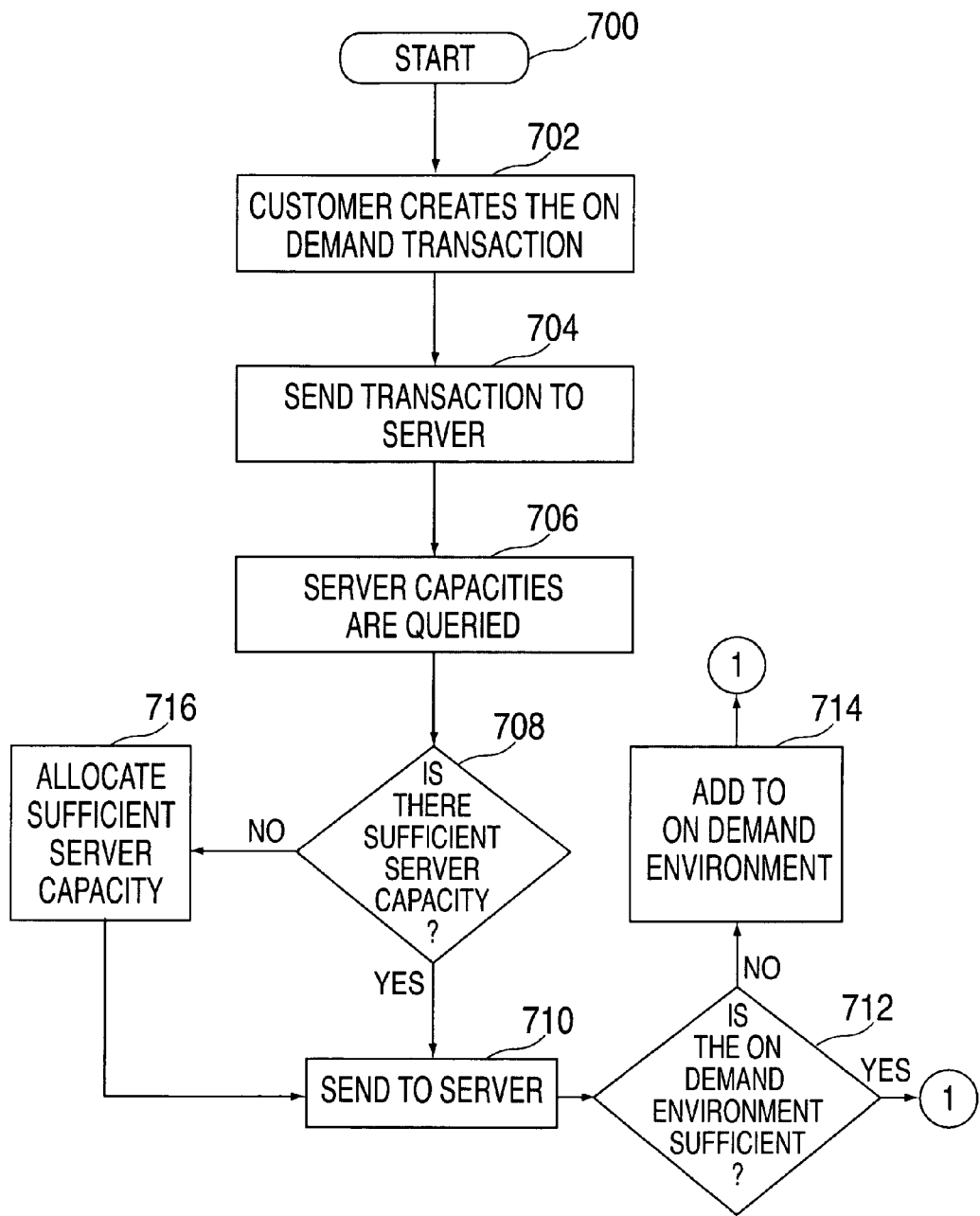
FIGS. 7A and 7B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 7B:
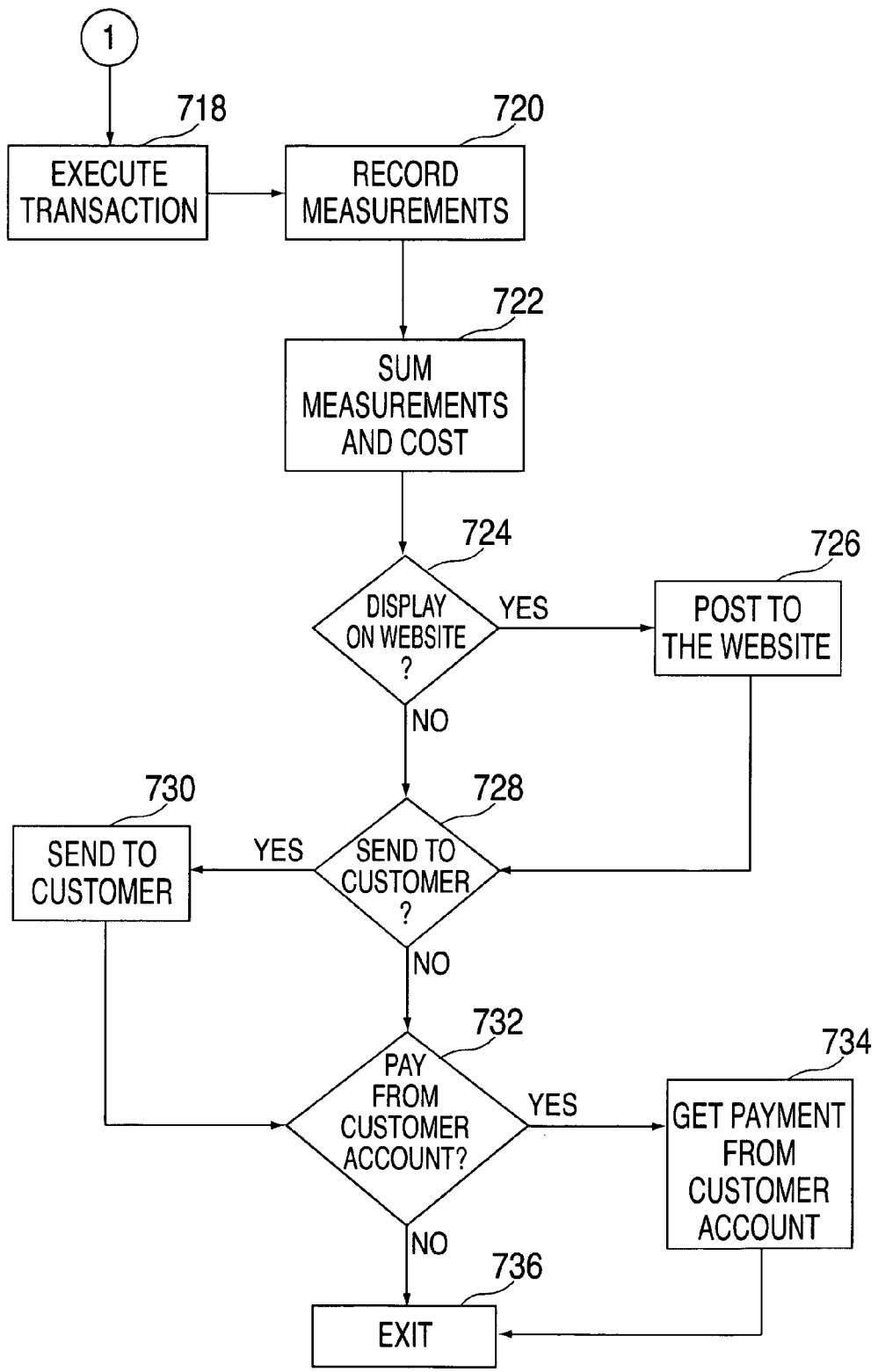

On demand computing for customized content system software. The process software for implementing the customized content services of the present invention may be shared; that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the customized content services software will now be provided, followed by a more detailed description of same made with reference to the flowcharts of FIGS. 7A and 7B.

The process software for implementing the present invention may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a website accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, and the following detailed description of same with reference to FIGS. 8A and 8B where the on demand processes are illustrated, will be more easily understood.

Step 700 begins the On Demand process. A transaction is created that contains the unique customer identification, the requested service type and any service parameters that further specify the type of service as indicated in step 702. The transaction is then sent to the main server as shown in step 704. In an On Demand environment, the main server may initially be the only server. Then, as capacity is consumed, other servers are added to the On Demand environment.

The server central processing unit (CPU) capacities in the On Demand environment are queried at step 706. The CPU requirement of the transaction is estimated, then the servers' available CPU capacity in the On Demand environment are compared to the transaction CPU requirement to see if there is sufficient CPU available capacity in any server to process the transaction as indicated in step 708. If there is not sufficient server CPU available capacity, then additional server CPU capacity is allocated to process the transaction as indicated in step 716. If there was already sufficient available CPU capacity, the transaction is sent to a selected server at step 710.

Before executing the transaction, a check is made of the remaining On Demand environment to determine if the environment has sufficient available capacity for processing the transaction as indicated at step 712. This environment capacity consists of elements such as, but not limited to, network bandwidth, processor memory, storage, etc. If there is insufficient available capacity, then capacity will be added to the On Demand environment as indicated in step 714. Otherwise, the required software to process the transaction is accessed, loaded into memory, and the transaction is executed as indicated in step 718.

The usage measurements are recorded as indicated in step 720. The usage measurements consist of the portions of those functions in the On Demand environment that are used to process the transaction. The usage of functions such as, but not limited to, network bandwidth, processor memory, storage and CPU cycles are what is recorded. The usage measurements are summed, multiplied by unit costs, and then recorded as a charge to the requesting customer as indicated in step 722.

If the customer has requested that the On Demand costs be posted to a website as indicated in step 724, then they are posted to a website at step 726. If the customer has requested that the On Demand costs be sent via e-mail to a customer address as indicated in step 728, then they are sent to the customer via e-mail as indicated in step 730. If the customer has requested that the On Demand costs be paid directly from a customer account at step 732, then payment is received directly from the customer account at step 734. The On Demand process proceeds to step 736 and then exits.

As indicated above, the customized content services enable entities requesting content from a website to reference a single World Wide Web (WWW) resource and retrieve a unique set of content in return. The customized content services utilizes information provided by the requesting entity such as the unique Internet Protocol (IP) address and Hypertext Transfer Protocol (HTTP) request headers to determine what type of information should be provided in the returned resource. When a requesting entity connects to the host system, the customized content services map the IP address to a domain name utilizing the Domain Name System (DNS). Based upon this information, the customized content services deduce the domain name of the requesting entity. The customized content services reference one or more databases that associate domain names and, if applicable, specific groups and returns content specific to that requesting entity.

As described above, embodiments can be embodied in the form of computer-implemented processes and apparatuses for practicing those processes. In exemplary embodiments, the invention is embodied in computer program code executed by one or more servers. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing customized content over a network, comprising:
    associating, via a customized content application executing on a computer, content of information resources with at least one of a domain name, group, and geography for network entities, the content including subject matter relating to the at least one of a domain name, group, and geography;
    for each of the network entities, the customized content application stores results of the associating in a database record in a storage device, the database record mapped to the domain name; and
    in response to receiving, at the computer, a request to access one of the information resources by a network entity, the customized content application performs:
    obtaining the domain name of the network entity by extracting an Internet Protocol (IP) address of the network entity, performing a reverse domain look up from the IP address, parsing the domain name resulting from the look up into subdomains, and using parsed subdomain information to search the database records;
    retrieving a database record corresponding to the domain name of the network entity in response to the search;
    determining an information resource to return to the network entity by identifying content of the information resource that is associated with the at least one of a domain name, group, and geography of the network entity via the database record; and
    providing the network entity with the information resource;
    wherein the information resource returned to the network entity is provided as client-side software that is interpreted and executed by the requesting network entity; and
    further comprising deploying process software for implementing customized content services, said deploying comprising: installing said process software on at least one server; identifying server addresses for users accessing said process software on said at least one server; sending said process software to said at least one server; and copying said process software to a file system of said at least one server.

2. The method of claim 1, further comprising:
    classifying, via the customized content application, the network entities by groups, the groups including at least one of:
    associations of individuals; business units; categories of commodities; subsidiaries of an enterprise;
    trading partners of an enterprise; and industry subsets.

3. The method of claim 1, wherein the geography is determined by at least one of a region, country, and language spoken.

4. The method of claim 3, wherein associating content with a country includes associating the content by country code provided in a domain name.

5. The method of claim 1, wherein associating content with at least one of a domain name, group, and geography for the network entities includes acquiring content from external sources of content.

6. The method of claim 1, wherein determining the information resource to return to the network entity further includes providing at least one of:" generic information elements common to all requesting network entities; and customized information elements specific to the requesting network entity.

7. The method of claim 1, wherein the associating content relating to the at least one of a domain name, group, and geography results in customized content and is provided in response to the request without an explicit request for the customized content.

8. A storage medium encoded with machine-readable program code for providing customized content over a network, the storage medium including instructions for causing a computer to implement a method, comprising:

associating content of information sources with at least one of a domain name, group, and geography for network entities, the content including subject matter relating to the at least one of a domain name, group, and geography;

for each of the network entities, storing results of the associating in a database record, the database record mapped to the domain name; and in response to receiving a request to access one of the information resources by a network entity:

obtaining the domain name of the network entity by extracting an Internet Protocol (IP) address of the network entity, performing a reverse domain look up from the IP address, parsing the domain name resulting from the look up into subdomains, and using parsed subdomain information to search the database records;

retrieving a database record corresponding to the domain name of the network entity in response to the search;

determining an information resource to return to the network entity by identifying content of the information resource that is associated with the at least one of a domain name, group, and geography of the network entity via the database record; and providing the network entity with the information resource;

wherein the information resource returned to the network entity is provided as client-side software that is interpreted and executed by the requesting network entity; and further comprising instructions for deploying process software for implementing customized content services, said deploying comprising: installing said process software on at least one server;

identifying server addresses for users accessing said process software on said at least one server;

sending said process software to said at least one server; and copying said process software to a file system of said at least one server.

9. The storage medium of claim 8, further comprising instructions for implementing:

classifying the network entities by groups, the groups including at least one of:
associations of individuals;
business units;
categories of commodities;
subsidiaries of an enterprise;
trading partners of an enterprise; and
industry subsets.

10. The storage medium of claim 8, wherein the geography is determined by at least one of a region, country, and language spoken.

11. The storage medium of claim 10, wherein associating content with a country includes associating the content by country code provided in a domain name.

12. The storage medium of claim 8, wherein associating content with at least one of a domain name, group, and geography for the network entities includes acquiring content from external sources of content.

13. The storage medium of claim 8, wherein determining the information resource to return to the network entity further includes providing at least one of: generic information elements common to all requesting network entities; and customized information elements specific to the requesting network entity.

14. The storage medium of claim 8, wherein the associating content relating to the at least one of a domain name, group, and geography results in customized content and is provided in response to the request without an explicit request for the customized content.

15. A system for implementing customized content services over a network, the system comprising:

a host system; and a customized content application executing on the host system, the customized content application associating content of information resources with at least one of a domain name, group, and geography for network entities, the content including subject matter relating to the at least one of a domain name, group, and geography;

for each of the network entities, the customized content application stores results of the associating in a database record, the database record mapped to the domain name; and in response to receiving a request to access one of the information resources by a network entity, the customized content application performs:

obtaining the domain name of the network entity by extracting an Internet Protocol (IP) address of the network entity, performing a reverse domain look up from the IP address, parsing the domain name resulting from the look up into subdomains, and using parsed subdomain information to search the database records;

retrieving a database record corresponding to the domain name of the network entity;

determining an information resource to return to the network entity by identifying content of the information resource that is associated with the at least one of a domain name, group, and geography of the network entity via the database record; and providing the network entity with the information resource;

wherein the information resource returned to the network entity is provided as client-side software that is interpreted and executed by the requesting network entity; and further comprising deploying process software for implementing customized content services, said deploying comprising: installing said process software on at least one server; identifying server addresses for users accessing said process software on said at least one server; sending said process software to said at least one server; and copying said process software to a file system of said at least one server.

16. The system of claim 15, wherein the customized content application further performs:

classifying the network entities by groups, the groups including at least one of:
associations of individuals;
business units;
categories of commodities;
subsidiaries of an enterprise;
trading partners of an enterprise; and
industry subsets.

17. The system of claim 15, wherein the geography is determined by at least one of a region, country, and language spoken; and wherein further, associating content with a country includes associating the content by country code provided in a domain name.

18. The system of claim 15, wherein associating content with at least one of a domain name, group, and geography for the entities includes acquiring content from external sources of content.

19. The system of claim 15, wherein determining the information resource to return to the network entity further includes providing at least one of: generic information elements common to all requesting network entities; and customized information elements specific to the requesting network entity.

20. The system of claim 15, wherein the associating content relating to the at least one of a domain name, group, and geography results in customized content and is provided in response to the request without an explicit request for the customized content.

* * * * *